(12) United States Patent
Yu et al.

(10) Patent No.: US 12,360,494 B2
(45) Date of Patent: Jul. 15, 2025

(54) HOLOGRAPHIC IMAGE PROCESSING METHOD AND HOLOGRAPHIC IMAGE PROCESSING APPARATUS

(71) Applicants: SAMSUNG ELECTRONICS CO., LTD., Suwon-si (KR); UNIVERSITY-INDUSTRY COOPERATION GROUP OF KYUNG HEE UNIVERSITY, Yongin-si (KR)

(72) Inventors: Hyeonseung Yu, Suwon-si (KR); Sung-Wook Min, Seoul (KR); Youngrok Kim, Seoul (KR); Wontaek Seo, Yongin-si (KR); Daeho Yang, Seoul (KR); Hongseok Lee, Seoul (KR)

(73) Assignees: SAMSUNG ELECTRONICS CO., LTD., Suwon-si (KR); UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 465 days.

(21) Appl. No.: 17/885,327

(22) Filed: Aug. 10, 2022

(65) Prior Publication Data
US 2023/0236545 A1    Jul. 27, 2023

(30) Foreign Application Priority Data
Jan. 21, 2022 (KR) .................. 10-2022-0009149

(51) Int. Cl.
*G03H 1/22*   (2006.01)
*G03H 1/00*   (2006.01)
*G03H 1/04*   (2006.01)

(52) U.S. Cl.
CPC ......... *G03H 1/2249* (2013.01); *G03H 1/0005* (2013.01); *G03H 1/0402* (2013.01);
(Continued)

(58) Field of Classification Search
CPC .. G03H 1/2249; G03H 1/0005; G03H 1/0402; G03H 2001/0436;
(Continued)

(56) References Cited

U.S. PATENT DOCUMENTS 11,150,605 B1    10/2021   Xiao et al.
2019/0294108 A1*   9/2019   Ozcan .................. G06V 10/82
(Continued)

FOREIGN PATENT DOCUMENTS

CN        110308547 A  * 10/2019  ......... G02B 21/0032
KR    10-2019-0092151 B1    8/2019
(Continued)

OTHER PUBLICATIONS

Kaiming He et al, "Deep residual learning for image recognition", arXiv:1512.03385v1 [cs.CV], Dec. 10, 2015, 12 pages.
Hyeonseung Yu et al., "Deep learning-based incoherent holographic camera enabling acquisition of real-world holograms for holographic streaming system", nature communications, https://doi.org/10.1038/s41467-023-39329-0, Jun. 14, 2023, 13 pages.

*Primary Examiner* — Arnel C Lavarias
(74) *Attorney, Agent, or Firm* — Sughrue Mion, PLLC

(57) ABSTRACT

Provided is a holographic image processing apparatus including a memory configured to store at least one instruction, and a processor configured to execute the at least one instruction stored in the memory to generate a corrected holographic image by correcting an original holographic image captured by a holographic camera based on a neural network configured to learn hologram correction in advance.

17 Claims, 10 Drawing Sheets

(52) U.S. Cl.
CPC ............... *G03H 2001/0436* (2013.01); *G03H 2001/2281* (2013.01); *G03H 2226/02* (2013.01)

(58) Field of Classification Search
CPC ....... G03H 2001/2281; G03H 2226/02; G03H 1/00; G03H 2001/0083; G03H 1/0443; G03H 2001/0452; G03H 2001/0454; G03H 1/08; G03H 1/0808; G03H 2001/0816; G03H 1/0866; G03H 2001/0883; G03H 1/0891; G03H 1/22; G03H 2001/2223; G03H 2001/2234; G03H 1/2294; G03H 1/26; G03H 2210/40; G03H 2210/46; G06N 3/00; G06N 3/02; G06N 3/08; G06N 20/00
USPC ............... 359/22, 1, 9, 32, 33, 35; 430/1, 2; 706/12, 15, 16, 25, 902, 932
See application file for complete search history.

(56) References Cited

U.S. PATENT DOCUMENTS

| | | |
|---|---|---|
| 2021/0149338 A1 | 5/2021 | Min et al. |
| 2021/0279951 A1 | 9/2021 | Yoon et al. |

FOREIGN PATENT DOCUMENTS

| | | |
|---|---|---|
| KR | 10-2020-0090417 A | 7/2020 |
| KR | 10-2020-0104068 A | 9/2020 |
| KR | 10-2190773 B1 | 12/2020 |
| KR | 10-2021-0113053 A | 9/2021 |

* cited by examiner

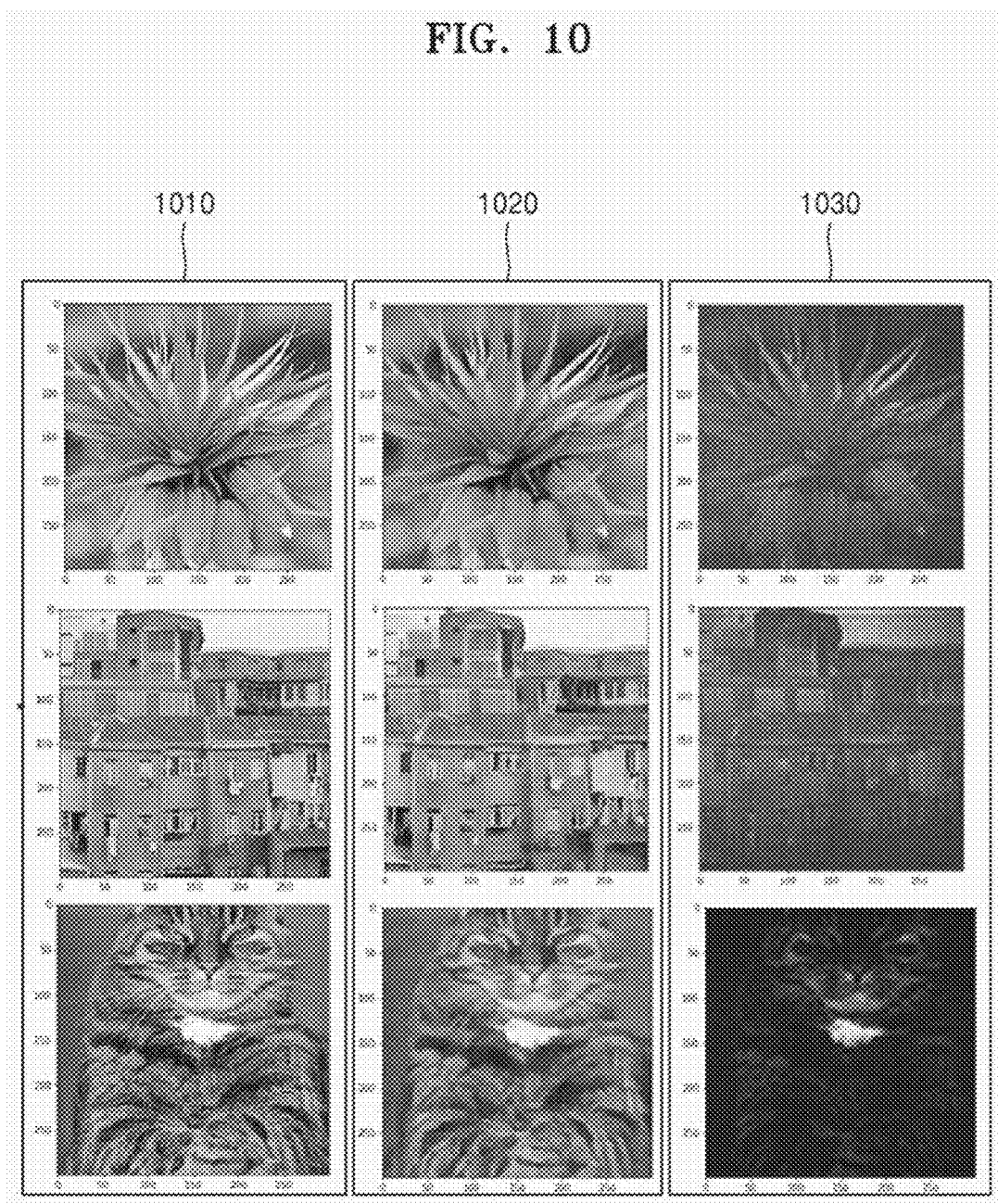

HOLOGRAPHIC IMAGE PROCESSING METHOD AND HOLOGRAPHIC IMAGE PROCESSING APPARATUS

CROSS-REFERENCE TO RELATED APPLICATION

This application is based on and claims priority under 35 U.S.C. § 119 to Korean Patent Application No. 10-2022-0009149, filed on Jan. 21, 2022, in the Korean Intellectual Property Office, the disclosure of which is incorporated by reference herein in its entirety.

BACKGROUND

1. Field

Example embodiments of the present specification relate to a holographic image processing method and a holographic image processing apparatus.

2. Description of Related Art

Holography is technology for recording and reproducing three-dimensional information of an object by using diffraction and interference of light. Holography uses two important components, that is, a camera that may acquire a hologram and a holographic display that may reproduce the acquired hologram.

A holographic display is a device for providing images with a sense of depth in a space and may directly reproduce an optical field of an actual three-dimensional image to provide a realistic and fatigue-free image. In order to reproduce images in a holographic display, data in which three-dimensional content is recorded as a hologram is required.

A hologram is technology for recording amplitude and phase information of an object wave and has an advantage of accurately expressing and reproducing three-dimensional depth information of an object. By using the hologram, a real three-dimensional object may be captured by a special holographic camera or may be calculated by a computer algorithm. The latter method is generally referred to as a computer generated hologram (CGH).

The holographic camera may include, for example, a self-interference digital holography (SIDH) camera. The SIDH camera may acquire a hologram of incident light propagating from a three-dimensional object. The SIDH camera has a great advantage of operating even with a non-coherent light source, and thus, SIDH has great potential for use in a general-purpose three-dimensional camera.

However, in spite of the great potential, there is a problem in that image quality is reduced when an image is reproduced from a hologram acquired by the SIDH camera.

SUMMARY

One or more example embodiments provide a holographic image processing method and a holographic image processing apparatus. Various example embodiments of the present specification generate a corrected hologram by filtering noise or correcting colors of a holographic image captured by a holographic camera. The technical problems to be achieved by the example embodiment are not limited to the technical problems as described above, and other technical problems may be inferred from the following embodiments.

Additional aspects will be set forth in part in the description which follows and, in part, will be apparent from the description, or may be learned by practice of the example embodiments of the disclosure.

According to an aspect of an example embodiment, there is provided a holographic image processing apparatus including a memory configured to store at least one instruction, and a processor configured to execute the at least one instruction stored in the memory to generate a corrected holographic image by correcting an original holographic image captured by a holographic camera based on a neural network configured to learn hologram correction in advance.

The processor may be further configured to propagate the original holographic image to a preset depth and input the original holographic image to the neural network.

The processor may be further configured to generate a training data set by propagating N holograms captured by the holographic camera to a preset depth.

The N holograms may be obtained as the holographic camera captures each of N original images located at different depths from the holographic camera.

The N original images may include two-dimensional planar images.

The processor may be further configured to generate a training data set based on an original image, and the neural network may be further configured to receive the training data set to generate a corrected hologram set, reproduce the corrected hologram set to generate a reproduction image set, obtain a loss value by comparing the reproduction image set with an original image set, and learn the hologram correction in a direction that the loss value reduces.

The processor may be further configured to generate the reproduction image set by propagating the corrected hologram set to an original depth of the original image set.

The neural network may include a resnet block.

According to another aspect of an example embodiment, there is provided a holographic image processing method including training a neural network based on a training data set generated based on an original image, and generating a corrected holographic image by correcting an original holographic image captured by a holographic camera based on the neural network configured to learn hologram correction in advance.

The holographic image processing method may further include propagating the original holographic image to a specific depth and inputting the original holographic image to the neural network.

The training data set may be generated by propagating N holograms captured by the holographic camera to a preset depth.

The N holograms may be obtained as the holographic camera captures each of N original images located at different depths from the holographic camera.

The N original images may include two-dimensional planar images.

The training data set may be generated based on the original image, and the training of the neural network may include generating a corrected hologram set by inputting the training data set to the neural network, generating a reproduction image set by reproducing the corrected hologram set, obtaining a loss value by comparing the reproduction image set with an original image set, and learning the hologram correction in a direction that the loss value reduces.

In the generating of the reproduction image set, the reproduction image set may be generated by propagating the corrected hologram set to an original depth of the original image set.

According to yet another aspect of an example embodiment, there is provided a holographic image processing system including a holographic camera configured to capture an original holographic image, a holographic image processing apparatus including a memory configured to store at least one instruction, and a processor configured to execute the at least one instruction stored in the memory to generate a corrected holographic image by correcting the original holographic image based on a neural network configured to learn hologram correction in advance.

The processor may be further configured to propagate the original holographic image to a preset depth and input the original holographic image to the neural network.

The processor may be further configured to generate a training data set by propagating N holograms captured by the holographic camera to a preset depth.

The N holograms may be obtained as the holographic camera captures each of N original images located at different depths from the holographic camera.

The N original images may include two-dimensional planar images.

BRIEF DESCRIPTION OF THE DRAWINGS

The above and/or other aspects, features, and advantages of example embodiments of the disclosure will be more apparent from the following description taken in conjunction with the accompanying drawings, in which:

FIG. 10 illustrates an experimental result of applying holographic image processing according to an example embodiment.

DETAILED DESCRIPTION

Figure 1:
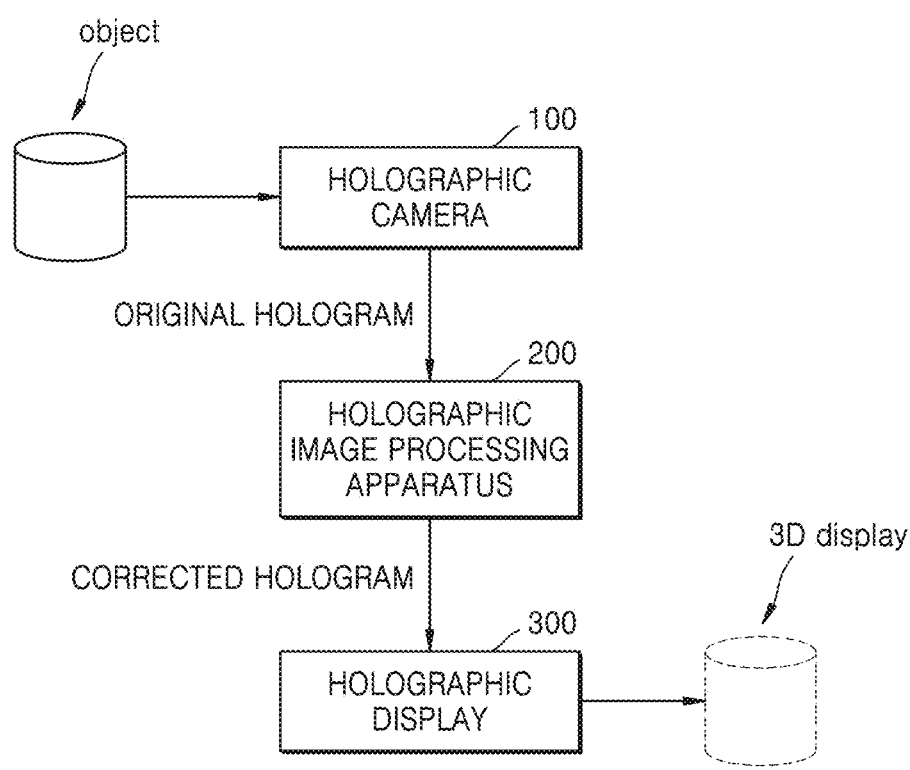
FIG. 1 is a schematic diagram of a holographic system according to an example embodiment.

Reference will now be made in detail to embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

The terms used in the example embodiments are selected as currently widely used general terms as possible while considering the functions in the present embodiments, which may vary depending on intention or precedent of a person skilled in the art, emergence of new technology, and so on. In addition, there are also randomly selected terms in a certain case, and in this case, the meaning will be described in detail in describing the example embodiment. Therefore, the terms used in the example embodiments should be defined based on meaning of the term and overall content of the example embodiments, rather than a simple name of the term.

In describing the example embodiments, when it is described that a certain portion is connected to another portion, this includes not only a case in which the certain portion is directly connected another portion, but also a case in which the certain portion is electrically connected to another portion with another component therebetween. Singular expressions include plural expressions unless the context clearly indicates otherwise. In addition, when a portion "includes" a certain component, this means that other components may be further included rather than excluding other components unless specifically stated to the contrary.

Terms such as "consist of", "be composed of", "include", or "comprise" used in the example embodiments should not be construed as including all of the various components or various steps described in the specification, and it should be construed that some components or steps may not be included or may further include additional components or steps.

In addition, terms including ordinal numbers such as "first" or "second" used in this specification may be used to describe various components, but the components should not be limited by the terms. The terms described above may be used for the purpose of distinguishing one component from another component.

The description of the following example embodiments should not be construed as limiting the scope of rights, and what may be easily inferred by those skilled in the art should be construed as belonging to the scope of the embodiments. Hereinafter, example embodiments for purposes of illustration will be described in detail with reference to the accompanying drawings.

FIG. 1 is a schematic diagram of a holographic system according to an example embodiment.

The holographic system according to the example embodiment includes a holographic camera 100, a holographic image processing apparatus 200, and a holographic display 300.

The holographic camera 100 acquires a hologram by imaging an object. A hologram may display an object in three-dimensional (3D) space by using an interference pattern of an object wave and a reference wave. The holographic camera 100 may include, for example, a self-interference digital holography (SIDH) camera. The holographic camera 100 has an advantage of being configured to operate even with a non-coherent light source, and thus, the holographic camera 100 has great potential for use in a general-purpose 3D camera.

The holographic image processing apparatus 200 filters noise of a hologram or corrects colors and the like. The holographic image processing apparatus 200 receives a hologram captured by the holographic camera 100. The holographic image processing apparatus 200 filters noise of an input hologram or corrects colors of an input hologram and the like. Hereinafter, a hologram received by the holographic image processing apparatus 200 is referred to as an original hologram, and a hologram obtained by processing an image of the original hologram by using the holographic image processing apparatus 200 is referred to as a corrected hologram. For example, the holographic image processing apparatus 200 generates a corrected hologram by filtering noise of the original hologram captured by the holographic camera 100 or correcting colors of the original hologram and the like.

The holographic display 300 may correspond to a device that may display a holographic image in a 3D space as a hologram reproducing device. The holographic display 300 may receive the corrected hologram provided by the holographic image processing apparatus 200. The holographic display 300 may include a hardware module for hologram reproduction, such as a spatial light modulator (SLM). The SLM may correspond to an amplitude SLM for controlling an amplitude of light, a phase SLM for controlling a phase of light, or the like. In addition, the holographic display 300 may include various types of display panels, such as a liquid crystal on silicon (LCoS) display, a liquid crystal display (LCD), and an organic light emitting diode (OLED) display.

Figure 2:
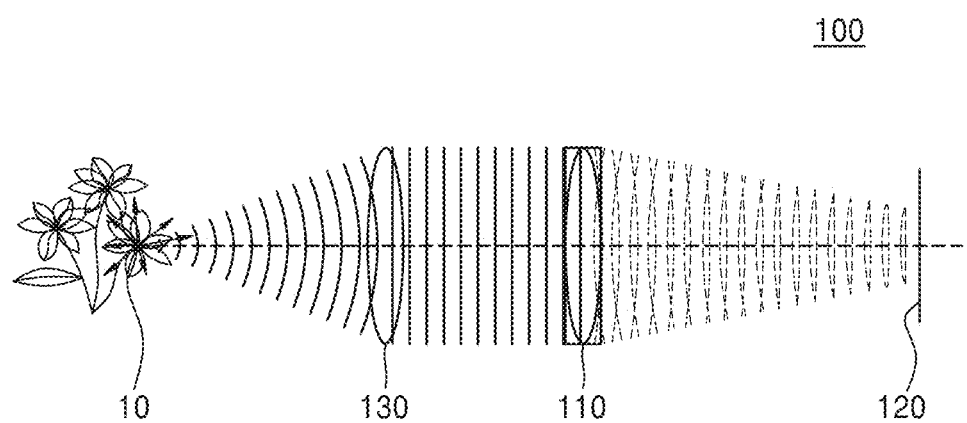
FIG. 2 is a conceptual diagram conceptually illustrating a basic configuration of a self-interference digital holography camera according to an example embodiment.

FIG. 2 is a conceptual diagram conceptually illustrating a basic configuration of a self-interference digital holography camera according to an example embodiment.

The holographic camera 100 has a great advantage of being configured to operate even with a non-coherent light source. The holographic camera 100 has a structure configured to acquire a hologram by generating an interference fringe by selfinterfering incident light propagating from a target object 10. The holographic camera 100 according to an example embodiment includes a geometric phase lens 110 that transmits incident light therethrough to change the incident light into left circularly polarized light and right circularly polarized light, an image sensor 120 that receives the left circularly polarized light and the right circularly polarized light through the geometric phase lens 110, and an incident lens 130 that is in front of the geometric phase lens 110 to collect the incident light. Incident light is changed to left circularly polarized light and right circularly polarized light while passing through the geometric phase lens 110, and an interference fringe is generated by the left circularly polarized light and the right circularly polarized light. The interference fringe is generated on the image sensor 120 to be acquired by the image sensor 120.

The geometric phase lens 110 is an element in which a liquid crystal maintains a certain fixed arrangement to act as a lens. There is a difference in that a general lens performs dynamic phase modulation to converge or diverge incident light by adjusting a thickness of a medium with different refractive indices and modulating a wavefront of the incident light, and the geometric phase lens 110 has a phase change due to a change in a polarization state of light according to birefringence characteristics of liquid crystal resulting in modulation of a wavefront of incident light.

The holographic camera 100 has a great advantage of being configured to operate even with a non-coherent light source, but when an image is reproduced from a hologram acquired by the holographic camera 100, image quality may be reduced. A major factor of reduction in image quality includes aberration made by the geometric phase lens 110, shot noise, an increase in noise due to insufficient light quantity, and the like.

In addition, in the process of reproducing an image from a hologram acquired by the holographic camera 100, a focal length of each wavelength is also shifted due to imperfection of the geometric phase lens 110. For example, when the hologram acquired by the holographic camera 100 is reproduced by the holographic display 300, images are formed at different foci for each color, and thus, accurate focus information may not be provided. Therefore, in order to clearly display a hologram acquired by the holographic camera 100 on the holographic display 300 as accurate 3D information, it is essential to filter the acquired hologram to increase image quality.

The holographic image processing apparatus 200 according to various example embodiments to be described below aims to generate a corrected hologram by filtering noise of an original hologram captured by the holographic camera 100 or correcting colors of an original hologram. However, the technical idea of the present disclosure is not limited to processing a holographic image by limiting only the hologram captured by the holographic camera 100. When a hologram is captured by the holographic camera 100, the holographic image processing apparatus 200 according to the example embodiment may receive an original hologram and filter noise or correct colors, thereby generating a corrected hologram.

Figure 3:
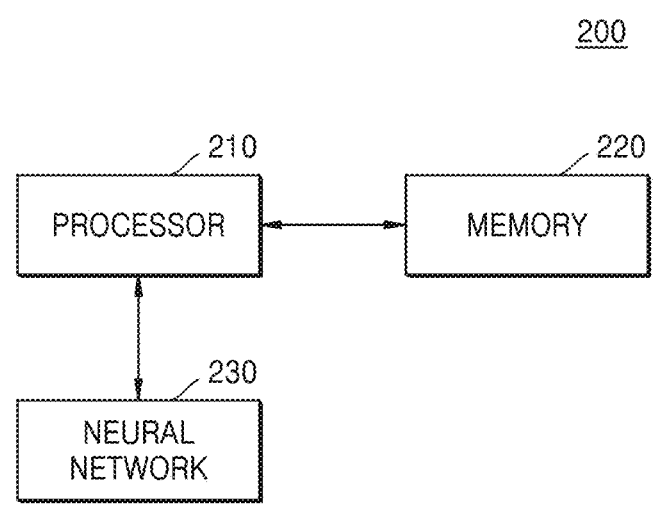
FIG. 3 is a block diagram illustrating a hardware configuration of a holographic image processing apparatus according to an example embodiment.

FIG. 3 is a block diagram illustrating a hardware configuration of the holographic image processing apparatus 200 according to an example embodiment.

The holographic image processing apparatus 200 may include a processor 210, a memory 220, and a neural network 230. The holographic image processing apparatus 200 illustrated in FIG. 3 includes only components related to the example embodiments. Accordingly, it is obvious to those skilled in the art that the holographic image processing apparatus 200 may further include other general-purpose components in addition to the components illustrated in FIG. 3.

In an example embodiment, the holographic image processing apparatus 200 may generate a holographic image with increased quality by correcting a holographic image captured by the holographic camera 100 by using at least one neural network 230. In various example embodiments, the processor 210 may correct a holographic image by propagating a holographic image captured by the holographic camera 100 to a preset depth and inputting the holographic image to the neural network 230.

The processor 210 may be provided in various types of computing devices, such as a personal computer (PC), a server, a television (TV), a mobile device (a smartphone, a tablet device, or the like), an embedded device, an autonomous vehicle, a wearable device, an augmented reality (AR) device, and an Internet of things (IoT) device. For example, the processor 210 may include a central processing unit (CPU), a graphics processing unit (GPU), an application processor (AP), or a neural processing unit (NPU), but is not limited thereto.

The processor 210 may include an array of a plurality of logic gates or may include a combination of a general-purpose microprocessor and the memory 220 in which a program may be executed by the microprocessor. In addition, those skilled in the art to which the example embodiments disclosed in the present disclosure pertains may understand that the processor 210 may be implemented in other types of hardware.

The processor 210 controls all operations of the holographic image processing apparatus 200. In the example embodiment, the processor 210 may control the neural network 230. In the example embodiment, the processor 210 may propagate an original holographic image to a preset depth and input the original holographic image to the neural network 230. The processor 210 may control the holographic image processing apparatus 200 by executing one or more instructions stored in the memory 220.

In an example embodiment, the holographic image processing apparatus 200 may use artificial intelligence (AI) technology. The AI technology may include machine learning (deep learning) and element technologies using the machine learning. The AI technology may be implemented by using algorithms. Here, an algorithm or a set of algorithms for implementing the AI technology is called a neural network. The neural network 230 may receive input data, perform calculation for analysis and classification, and output result data. As such, in order for the neural network 230 to accurately output the result data corresponding to the input data, the neural network 230 needs to be trained. Here, "training" may indicate that the neural network 230 receives various pieces of data to be trained to discover or acquire a method of analyzing the received data, a method of classifying the received data, and/or a method of extracting features necessary for generating result data from input data. Training the neural network 230 means that an AI model with desired features is generated by applying a learning algorithm to a plurality of pieces of training data. The training may be performed by the holographic image processing apparatus 200 that performs AI in the example embodiment or may also be performed by a separate server or system.

The learning algorithm may train a preset target device (for example, a robot) by using a plurality of pieces of training data such that the preset target device itself may make a decision or make a prediction. The learning algorithm may include, for example, supervised learning, unsupervised learning, semi-supervised learning, and reinforcement learning. However, the learning algorithm in the example embodiment is not limited to the examples described above unless otherwise specified.

A set of algorithms for outputting output data corresponding to input data through the neural network 230, software that executes the set of algorithms, and/or hardware that executes the set of algorithms may be referred to as an "AI model" (or an "artificial intelligence model").

The processor 210 may process input data according to a predefined operation rule or an AI model. The predefined operation rule or the AI model may be generated by using a preset algorithm. In addition, the AI model may be obtained by training a preset algorithm. The processor 210 may generate output data corresponding to input data through the AI model.

In the example embodiment, the processor 210 may store at least one AI model. In the example embodiment, the processor 210 may generate output data from an input image by using a plurality of AI models. In the example embodiment, the memory 220, rather than the processor 210, may store the plurality of AI models.

The memory 220 according to the example embodiment may store at least one instruction. The memory 220 may store at least one program executed by the processor 210. At least one neural network 230 and/or a predefined operation rule or an AI model may be stored in the memory 220. In addition, the memory 220 may store data input to or output from the holographic image processing apparatus 200.

The memory 220 may include at least one of a volatile memory and a nonvolatile memory. The non-volatile memory includes read-only memory (ROM), programmable ROM (PROM), electrically programmable ROM (EPROM), electrically erasable and programmable ROM (EEPROM), flash memory, phase-change RAM (PRAM), magnetic RAM (MRAM), resistive RAM (RRAM), ferroelectric RAM (FeRAM), and the like. The volatile memory includes dynamic RAM (DRAM), static RAM (SRAM), synchronous DRAM (SDRAM), and the like. In the embodiment, the memory 220 may be implemented by at least one of a hard disk drive (HDD), a solid state drive (SSD), a compact flash (CF) memory, a secure digital (SD) memory, a micro secure digital (Micro-SD) memory, a mini secure digital (mini-SD) memory, an extreme digital (xD) memory, and a memory stick.

The neural network 230 may have various architectures and may be composed of a resnet block. In addition, the neural network 230 may have an architecture of a deep neural network (DNN) or an n-layer neural network. The DNN or the n-layer neural network may correspond to a convolutional neural network (CNN), a recurrent neural network (RNN), a deep belief network, or a restricted Boltzmann machine, or the like.

A hologram input to the neural network 230 and a hologram output from the neural network 230 may be composed of a complex number including amplitude information and phase information. The complex number may be expressed in three forms including a two-dimensional (2D) complex number array, a combination of an amplitude 2D array and a phase 2D array, and a combination of a real 2D array and an imaginary 2D array. Here, the 2D array means a 3-channel 2D array including red-green-blue (RGB) color information. A hologram input to the neural network 230 and a hologram output from the neural network 230 do not have to be expressed as a complex number of the same format.

In various example embodiments, the neural network 230 may generate a depth map from an input hologram. Because the input hologram has depth information, the neural network 230 may automatically recognize 3D information of the input hologram and generate a depth map therefrom. A depth may indicate a distance by which an object is relatively separated from a position of the holographic camera 100.

The neural network 230 may be included in the holographic image processing apparatus 200. However, unlike the illustration of FIG. 3, the neural network 230 may be included in a separate device located outside the holographic image processing apparatus 200. In this case, the neural network 230 external to the holographic image processing apparatus 200 may receive data from the holographic image processing apparatus 200 and output a result of performing a deep learning operation. For example, implementation methods of the holographic image processing apparatus 200 and the neural network 230 are not limited by any one embodiment.

Figure 4:
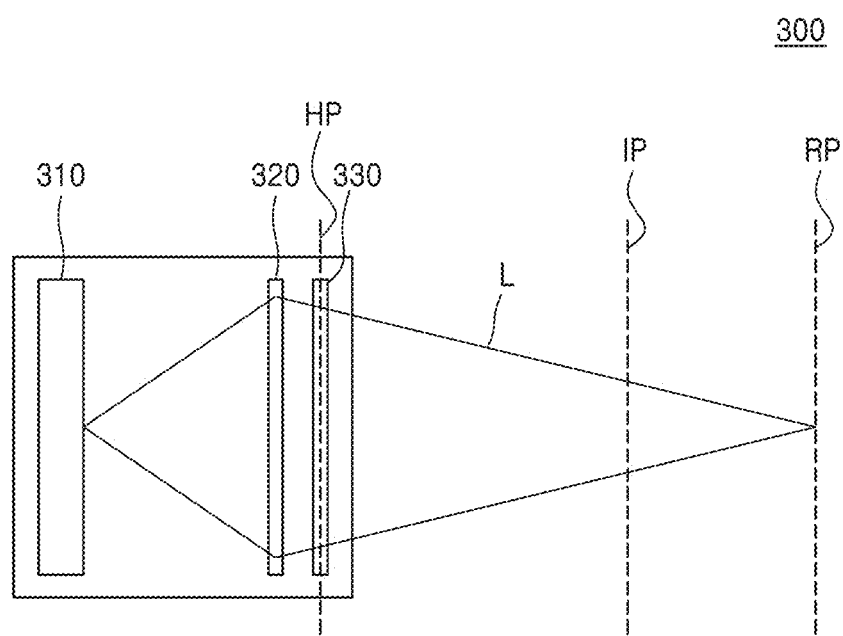
FIG. 4 is a diagram illustrating a holographic display according to example an embodiment.

FIG. 4 is a diagram illustrating the holographic display 300 according to the example embodiment.

The holographic display 300 may include a light source 310, an optical system 320, and a spatial light modulator 330.

The holographic display 300 may generate a hologram, based on a hologram plane HP located at the spatial light modulator 330, a reference plane RP located at the pupil of an observer, and an image plane IP in which a holographic image is located, and may reproduce a holographic image.

The holographic display 300 may display a holographic image on the image plane IP, based on the corrected hologram provided from the holographic image processing apparatus 200. The image plane IP may be composed of a plurality of layers.

The light source 310 may emit light to reproduce a holographic image. The light source 310 may include a laser diode and/or a light emitting diode but is not limited thereto. The light source 310 may be composed of an array including a plurality of light sources.

The optical system 320 may spatially focus a holographic image. The optical system 320 may spatially focus reproduction light L modulated by the spatial light modulator 330. For example, the optical system 320 may focus the reproduction light L on the reference plane RP. The optical system 320 may include a fixed focal length optical system with a fixed focal length and/or a variable focal length optical system with a variable focal length. In addition, the optical system 320 may include a refractive lens element and/or a diffractive lens element.

The spatial light modulator 330 may modulate light based on a hologram. The spatial light modulator 330 may form a hologram pattern for performing modulation by diffracting light based on the corrected hologram provided from the holographic image processing apparatus 200. The spatial light modulator 330 may include an amplitude modulator and/or a phase modulator.

Figure 5:
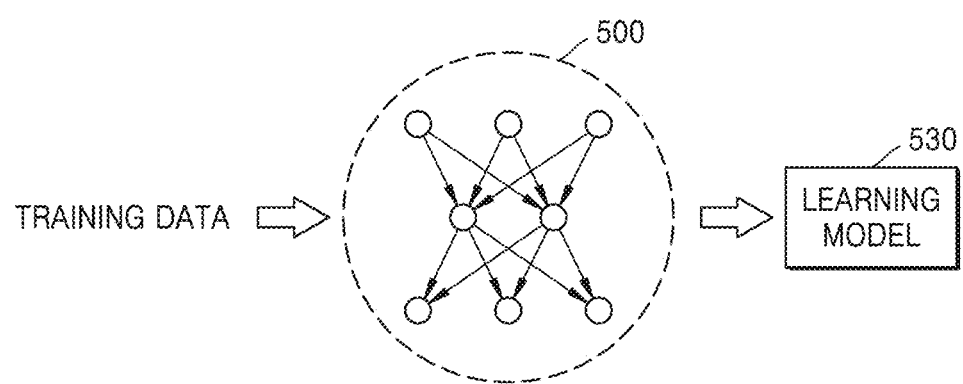
FIG. 5 is a diagram illustrating that a neural network learns a holographic image processing method from input data according to an example embodiment.

FIG. 5 is a diagram illustrating that a neural network learns a holographic image processing method from input data according to an example embodiment.

Referring to FIG. 5, a neural network 500 may acquire training data and acquire a learning model 530 by using the training data as an input value. The neural network 500 may learn a method of correcting a hologram from the plurality of pieces of training data in response to the plurality of pieces of input training data and may generate the learning model 530 based on a learned result.

In the example embodiment, the training data may be generated by using a training data set generated by the processor 210. The processor 210 may generate training data by propagating a hologram captured by the holographic camera 100 to a preset depth. In addition, the processor 210 may generate the training data as N training data sets instead of one piece of data. The processor 210 may generate a training data set by propagating N holograms captured by the holographic camera 100 to a preset depth.

Here, the N holograms are generated by capturing each of N original images by using the holographic camera 100. The N original images are two-dimensional planar images and are respectively located at different depths $d_1$ to $d_N$ from the holographic camera 100. For example, the N original images are respectively arranged at different distances from the holographic camera 100 to be captured by the holographic camera 100. Here, the N two-dimensional plane images may be the same or different from each other.

The learning model 530 may be the trained neural network 500 itself such that a desired result may be obtained by the neural network 500. For example, in order to correct a hologram, a plurality of weight values respectively applied to a plurality of nodes forming the neural network 500 may be set by training the neural network 500. Here, the weight values may indicate connection strengths between the plurality of nodes of the neural network 500. The weight values may be optimized through iterative learning and may be iteratively modified until the accuracy of the result satisfies a preset reliability level. The learning model 530 may be the neural network 500 formed by finally set weight values.

According to an example embodiment, an operation of learning a method of correcting a hologram from training data by using one or more neural networks 500 may be performed in advance. In addition, as some of a plurality of pieces of training data are changed, the learning model 530 may be updated.

In an example embodiment, an operation of learning a method of correcting a hologram from training data by using one or more neural networks 500 may be performed by a computing device. For example, as an external computing device performs a learning operation and the holographic image processing apparatus 200 receives the learning model 530 from the external computing device, the amount of calculations to be performed by the holographic image processing apparatus 200 may be reduced. The holographic image processing apparatus 200 may receive the learning model 530 from an external server and store the learning model 530 in a memory thereof and correct a holographic image captured by the holographic camera 100 by using the stored learning model 530.

Figure 6:
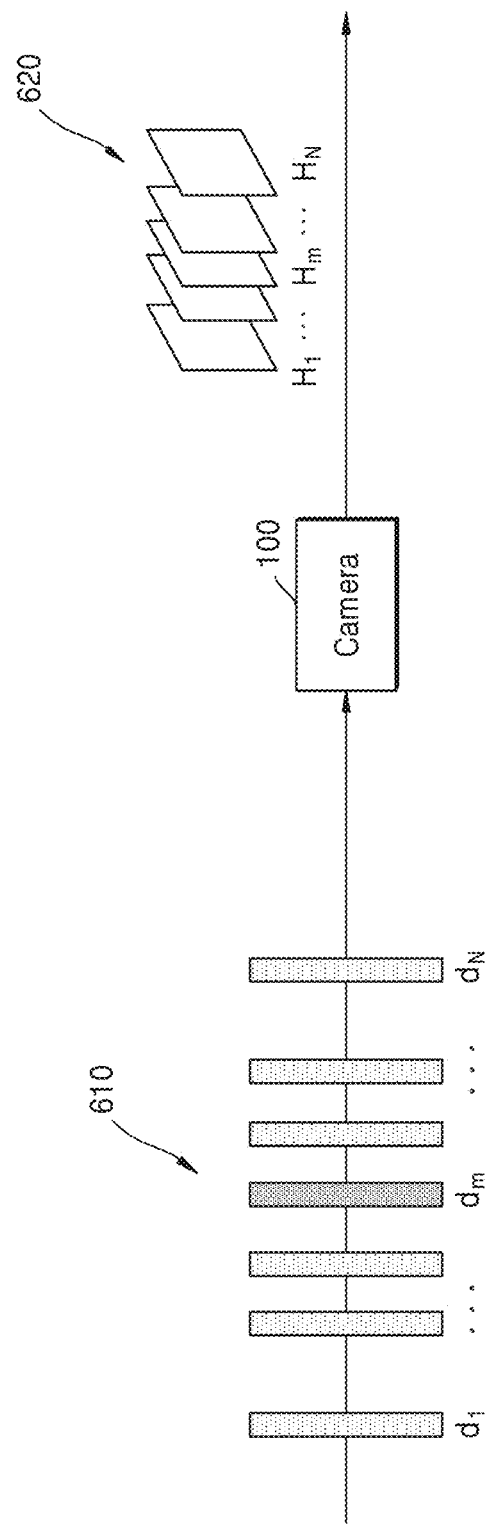
FIG. 6 is a diagram illustrating a process of capturing an original image by a holographic camera to generate a training data set according to an example embodiment.

FIG. 6 is a diagram illustrating a process of capturing an original image by using a holographic camera to generate a training data set according to an example embodiment.

The holographic camera 100 captures an original image set 610 including $I_1 \ldots I_M \ldots I_N$ to generate a captured hologram set 620 including $H_1 \ldots H_M \ldots H_N$. The captured hologram set 620 generated by the holographic camera 100 is input to the holographic image processing apparatus 200. The original image set 610 may include N original images. Each of the N original images may be at different distances from the holographic camera 100. For example, the N original images are respectively located at different depths $d_1$ to $d_N$. The N original images may be respectively composed of N two-dimensional planar images. The N two-dimensional planar images may be the same as or different from each other.

Figure 7:
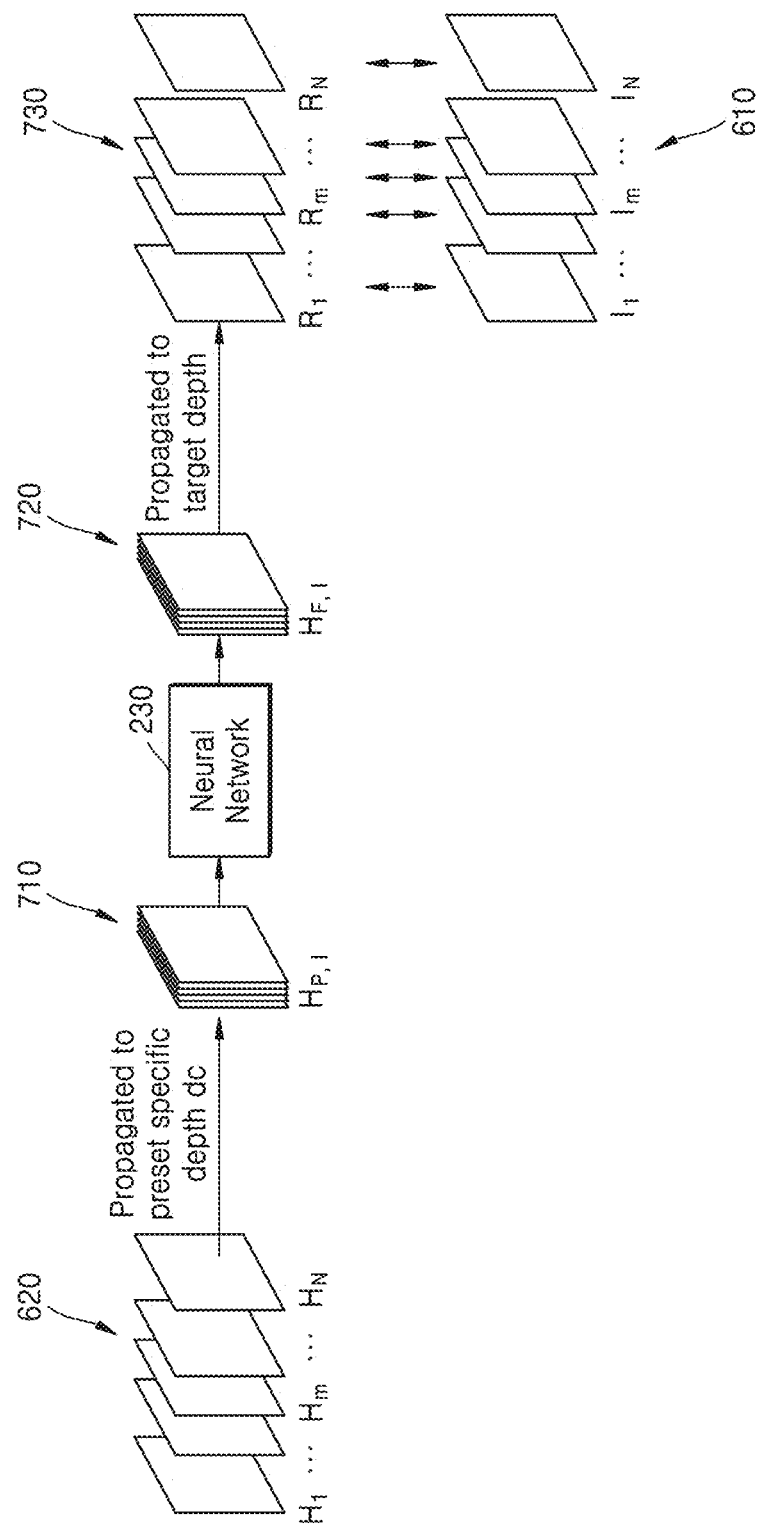
FIG. 7 is a diagram illustrating a process of generating a training data set and training a neural network according to an example embodiment.

FIG. 7 is a diagram illustrating a process of generating a training data set and training a neural network according to an example embodiment.

The processor 210 generates a training data set by propagating, to a preset specific depth $d_c$, the captured hologram set 620 generated as the holographic camera 100 captures the original image set 610.

A training data set 710 including $H_{P,I}$ generated by the processor 210 is used as training data for training the neural network 230.

The neural network 230 receives the training data set 710 and generates a corrected hologram set 720 including $H_{F,I}$.

In the next step, the neural network 230 propagates the corrected hologram set 720 to an original depth (a target depth). The original depth refers to a depth at which an original image, which is a basis of a corrected hologram, is located. For example, the original depth refers to depths $d_1$ to $d_N$ of the original images illustrated in FIG. 6.

In a next step, the neural network 230 reproduces the corrected hologram set 720 to generate a reproduction image set 730 including $R_1 \ldots R_N$. The reproduction image set 730 may be generated by numerically reproducing a hologram set by using digital signal processing technology.

In the next step, the neural network 230 calculates a loss value by comparing the reproduction image set 730 with the original image set 610. The neural network 230 learns hologram correction in a direction that the loss value reduces. The loss function may use various functions, such as a mean squared error (MSE) between image sets or Visual Geometry Group (VGG).

Figure 8:
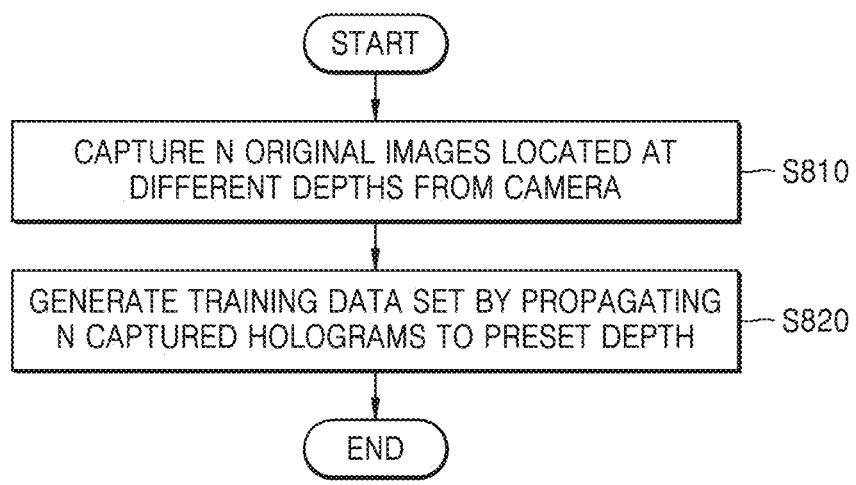
FIG. 8 is a flowchart illustrating a method of generating a training data set according to an example embodiment.

FIG. 8 is a flowchart illustrating a method of generating a training data set, according to an embodiment.

Referring to FIGS. 6 to 8, in step S810, the holographic camera 100 captures the original image set 610 to generate a captured hologram set 620. An original image set may be composed of N original images. The N original images are located at different distances from the holographic camera 100.

In step S820, the processor 210 generates the training data set 710 by propagating, to a preset depth $d_c$, the captured hologram set 620 generated by capturing the original image set 610 by using the holographic camera 100.

Figure 9:
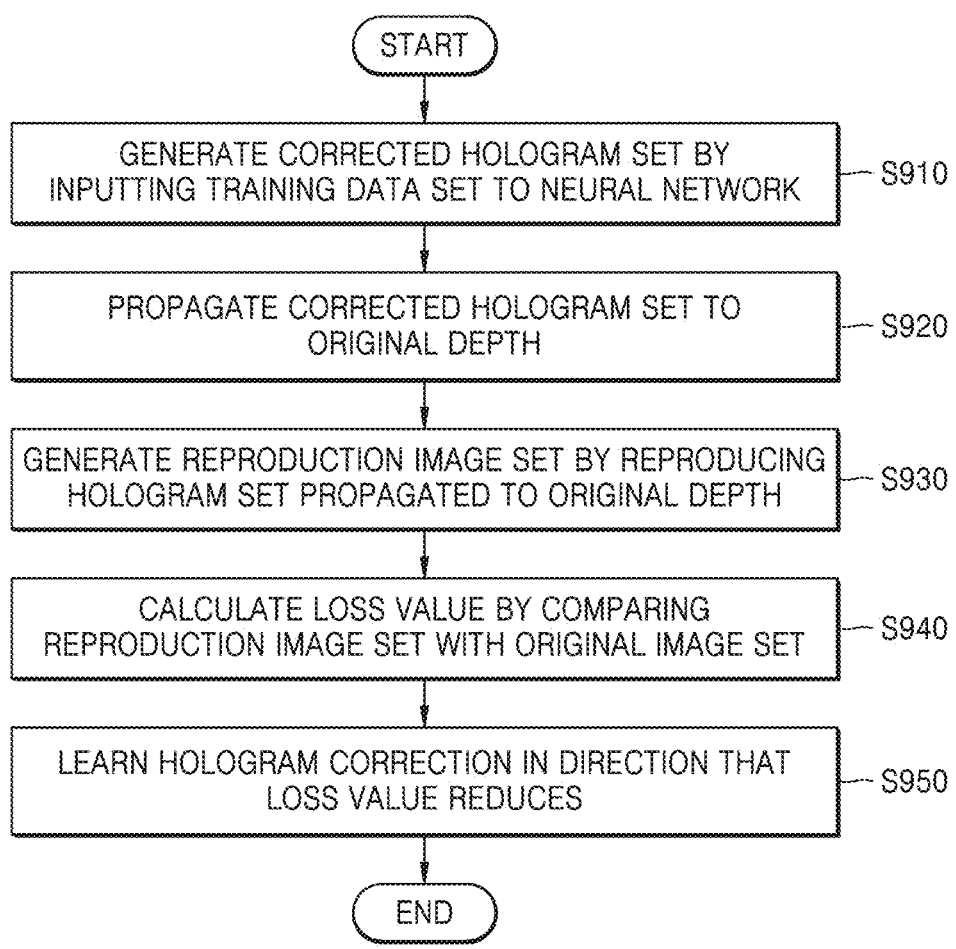
FIG. 9 is a flowchart illustrating a method of training a neural network according to an example embodiment.

FIG. 9 is a flowchart illustrating a method of training the neural network 230 according to an example embodiment.

The method of training the neural network 230 includes steps that are processed in a time series by the neural network 230 illustrated in FIGS. 3 and 5. Accordingly, it can be seen that the above descriptions of the neural network 230 made with reference to FIGS. 3 and 5 may also be applied to the method of FIG. 9 even though there are omitted descriptions. Accordingly, redundant descriptions thereof are omitted.

Referring to FIGS. 7 and 9, in step S910, the neural network 230 receives the training data set 710 and generates the corrected hologram set 720.

In step S920, the neural network 230 propagates the corrected hologram set 720 to an original depth. Here, the original depth refers to a depth at which an original image, which is a basis of a corrected hologram, is located. For example, the original depth refers to depths $d_1$ to $d_N$ of the original images illustrated in FIG. 6.

In step S930, the neural network 230 reproduces the corrected hologram set 720 to generate the reproduction image set 730.

In step S940, the neural network 230 calculates a loss value by comparing the reproduction image set 730 with the original image set 610

In step S950, the neural network 230 learns hologram correction in a direction that the loss value reduces. The loss function may use various functions, such as an MSE between image sets or VGG.

FIG. 10 illustrates an experimental result of applying holographic image processing according to an example embodiment.

A reference numeral 1010 denotes original images. The original images 1010 may be composed of two-dimensional planar images.

A reference numeral 1020 denotes images reproduced from the corrected hologram. The holographic camera 100 generates an original hologram by capturing original images. The holographic image processing apparatus 200 receives an original hologram and generates a corrected hologram.

A reference numeral 1030 denotes original images reproduced from the original hologram captured by the holographic camera 100.

The experimental result of FIG. 10 illustrates that the quality of the images 1020 reproduced from a corrected hologram increased, compared to the quality of the images 1030 reproduced from an original hologram.

The example embodiments may also be implemented in the form of a computer-readable recording medium including instructions that are executable by a computer such as a program module executed by a computer. The computer-readable recording medium may be any available medium that is accessible by a computer and includes volatile and nonvolatile media, and removable and non-removable media. In addition, a computer-readable recording medium may include both a computer storage medium and a communication medium. The computer storage medium includes volatile and nonvolatile media and removable and non-removable media implemented by a certain method or technology for storage of information such as computer-readable instructions, data structures, program modules, or other data. The communication medium includes computer-readable instructions, data structures, other data of a modulated data signal, such as a program module, or other transmission mechanisms, and includes any information delivery medium.

In addition, in the present specification, a "unit" ora "portion" may include a hardware component such as a processor or a circuit, and/or a software component executed by a hardware component such as a processor.

The above description is for illustration, and those skilled in the art to which the present disclosure belongs will understand that the present disclosure may be easily modified into other forms without changing the technical idea or essential features of the present disclosure. Therefore, it should be understood that the example embodiments described above are illustrative in all respects and not restrictive. For example, each component described as a single type may be implemented in a dispersed form, and likewise components described as distributed form may also be implemented in a combined form.

The scope of the embodiment is indicated by the claims to be described below rather than the above detailed description, and the embodiment should be construed to include all changes or modifications derived from the meaning and scope of the claims and their equivalents.

It should be understood that example embodiments described herein should be considered in a descriptive sense only and not for purposes of limitation. Descriptions of features or aspects within each example embodiment should typically be considered as available for other similar features or aspects in other embodiments. While example embodiments have been described with reference to the figures, it will be understood by those of ordinary skill in the art that various changes in form and details may be made therein without departing from the spirit and scope as defined by the following claims and their equivalents.

What is claimed is:

1. A holographic image processing apparatus comprising:
a memory configured to store at least one instruction; and
a processor configured to execute the at least one instruction stored in the memory to generate a corrected holographic image by correcting an original holographic image captured by a holographic camera based on a neural network configured to learn hologram correction in advance,
wherein the processor is further configured to generate a training data set by propagating N original images captured by the holographic camera to a preset depth, and
wherein the neural network is further configured to receive the training data set to generate a corrected hologram set comprising corrected holographic images, generate a reproduction image set by propagating corrected holographic images to depths corresponding to original depths of the N original images, and obtain a loss value by comparing the reproduction image set with an original image set.

2. The holographic image processing apparatus of claim 1, wherein the processor is further configured to propagate the original holographic image to the preset depth and input the original holographic image to the neural network.

3. The holographic image processing apparatus of claim 1, wherein the N holograms are obtained as the holographic camera captures each of the N original images located at different depths corresponding to the original depths from the holographic camera.

4. The holographic image processing apparatus of claim 3, wherein the N original images comprise two-dimensional planar images.

5. The holographic image processing apparatus of claim 1,
wherein the neural network is further configured to learn the hologram correction in a direction that the loss value reduces.

6. The holographic image processing apparatus of claim 5, wherein the processor is further configured to generate the reproduction image set by numerically reproducing the corrected hologram set.

7. The holographic image processing apparatus of claim 1, wherein the neural network comprises a resnet block.

8. A holographic image processing method comprising:
training a neural network based on a training data set generated based on propagating N original images captured by a holographic camera to a preset depth; and
generating a corrected holographic image by correcting an original holographic image captured by the holographic camera based on the neural network configured to learn hologram correction in advance,
wherein the training of the neural network comprises generating a corrected hologram set comprising corrected holographic images by inputting the training data set to the neural network, generating a reproduction image set by propagating corrected holographic images to depths corresponding to original depths of the N original images, and obtaining a loss value by comparing the reproduction image set with an original image set.

9. The holographic image processing method of claim 8, further comprising propagating the original holographic image to a specific depth and inputting the original holographic image to the neural network.

10. The holographic image processing method of claim 8, wherein the N holograms are obtained as the holographic camera captures each of the N original images located at different depths corresponding to the original depths from the holographic camera.

11. The holographic image processing method of claim 10, wherein the N original images comprise two-dimensional planar images.

12. The holographic image processing method of claim 8, wherein the training of the neural network comprises learning the hologram correction in a direction that the loss value reduces.

13. The holographic image processing method of claim 12, wherein, in the generating of the reproduction image set, the reproduction image set is generated by numerically reproducing the corrected hologram set.

14. A holographic image processing system comprising:
a holographic camera configured to capture an original holographic image;
a holographic image processing apparatus comprising:
a memory configured to store at least one instruction; and
a processor configured to execute the at least one instruction stored in the memory to generate a corrected holographic image by correcting the original holographic image based on a neural network configured to learn hologram correction in advance,
wherein the processor is further configured to generate a training data set by propagating N original images captured by the holographic camera to a preset depth, and
wherein the neural network is further configured to receive the training data set to generate a corrected hologram set comprising corrected holographic images, generate a reproduction image set by propagating corrected holographic images to depths corresponding to original depths of the N original images, and obtain a loss value by comparing the reproduction image set with an original image set.

15. The holographic image processing apparatus of claim 14, wherein the processor is further configured to propagate the original holographic image to the preset depth and input the original holographic image to the neural network.

16. The holographic image processing apparatus of claim 14, wherein the N holograms are obtained as the holographic camera captures each of the N original images located at different depths corresponding to the original depths from the holographic camera.

17. The holographic image processing apparatus of claim 16, wherein the N original images comprise two-dimensional planar images.

* * * * *